US012780286B2

(12) United States Patent
Xiao et al.

(10) Patent No.: US 12,780,286 B2
(45) Date of Patent: Nov. 3, 2026

(54) STEERING WHEEL HIDING SYSTEM, METHOD, AND VEHICLE

(71) Applicant: AutoX, Inc., Grand Cayman (KY)

(72) Inventors: Jianxiong Xiao, Shenzhen (CN); Kai Wang, Shenzhen (CN); Conghe Wang, Shenzhen (CN); Jinheng Lu, Shenzhen (CN)

(73) Assignee: AutoX, Inc., Grand Cayman (KY)

( * ) Notice: Subject to any disclaimer, the term of this patent is extended or adjusted under 35 U.S.C. 154(b) by 0 days.

(21) Appl. No.: 19/219,248

(22) Filed: May 27, 2025

(65) Prior Publication Data

US 2025/0360958 A1 Nov. 27, 2025

(30) Foreign Application Priority Data

May 27, 2024 (CN) ......................... 202410666896.0

(51) Int. Cl.

| | |
|---|---|
| ***B62D 1/183*** | (2006.01) |
| ***B60K 35/28*** | (2024.01) |
| ***B60K 35/53*** | (2024.01) |
| ***B60K 35/81*** | (2024.01) |
| ***B60W 50/14*** | (2020.01) |
| ***B62D 1/187*** | (2006.01) |

(52) U.S. Cl.

CPC .............. *B62D 1/183* (2013.01); *B60K 35/28* (2024.01); *B60K 35/53* (2024.01); *B60K 35/81* (2024.01); *B60W 50/14* (2013.01); *B60K 2360/1876* (2024.01); *B60K 2360/682* (2024.01); *B60K 2360/685* (2024.01); *B60W 2050/146* (2013.01); *B60W 2540/223* (2020.02)

(58) Field of Classification Search

CPC ........ B62D 1/181; B62D 1/183; B62D 1/187; B62D 5/003; B62D 5/0484; B62D 5/0493; B60W 50/14; B60W 60/0013; B60W 60/005; B60W 2050/146; B60W 2540/223; B35K 35/22; B35K 35/28; B35K 35/53; B35K 35/6081; B35K 2360/175; B35K 2360/186; B35K 2360/682; B35K 2360/685

See application file for complete search history.

(56) References Cited

U.S. PATENT DOCUMENTS

| | | | | |
|---|---|---|---|---|
| 11,667,324 B2 * | 6/2023 | Ahn | ....................... | B60K 23/00 180/326 |
| 12,434,757 B1 * | 10/2025 | Wang | ..................... | B62D 1/181 |
| 2009/0033083 A1 * | 2/2009 | Kobayashi | ............. | B60K 37/20 280/779 |

(Continued)

*Primary Examiner* — Logan M Kraft
*Assistant Examiner* — Johnny H Hoang
(74) *Attorney, Agent, or Firm* — Hemisphere Law, PLLC

(57) ABSTRACT

A steering wheel hiding system for a vehicle is provided. By acquiring the driving state of the vehicle, determine whether the vehicle is in an autonomous driving state. After determining that the driving state is an autonomous driving state, control the folding of the steering wheel assembly and the movement of the column, and control the movement of the vehicle's display to obscure the steering wheel assembly. This ensures that the steering wheel does not occupy driving and passenger space while obscuring the steering wheel to enhance the aesthetics of the cockpit. Additionally, by using the display to obscure the steering wheel, a large screen can be installed in the cockpit, improving office comfort.

20 Claims, 4 Drawing Sheets

(56) References Cited

U.S. PATENT DOCUMENTS

| | | | | |
|---|---|---|---|---|
| 2019/0210633 | A1* | 7/2019 | Derocher | B62D 1/181 |
| 2021/0221434 | A1* | 7/2021 | Liu | B62D 6/008 |
| 2022/0161841 | A1* | 5/2022 | Kreutz | B62D 1/181 |
| 2022/0324505 | A1* | 10/2022 | Ku | B62D 1/187 |
| 2023/0043788 | A1* | 2/2023 | Ponikiewski | B62D 1/181 |
| 2023/0126450 | A1* | 4/2023 | Tinnin | B62D 1/181 74/493 |
| 2024/0227695 | A1* | 7/2024 | Bharathan | B60R 13/02 |
| 2025/0091636 | A1* | 3/2025 | Wen | B62D 1/181 |
| 2025/0222913 | A1* | 7/2025 | Kim | B60W 10/20 |

* cited by examiner

STEERING WHEEL HIDING SYSTEM, METHOD, AND VEHICLE

This non-provisional patent application claims priority under 35 U. S. C. § 119 from Chinese Patent Application No. 202410666896.0 filed on May 27, 2024, the entire content of which is incorporated herein by reference.

TECHNICAL FIELD

The disclosure relates to the field of autonomous driving technology, particularly to a steering wheel hiding system, method, and vehicle.

BACKGROUND

With the rapid development of vehicles, the autonomous driving function of vehicles has become increasingly sophisticated, significantly reducing the driving workload for drivers. Consequently, the operational frequency of the steering wheel will decrease significantly. However, in existing vehicles, after entering the autonomous driving phase, the steering wheel serves no purpose and occupies driving and passenger space without being obscured, resulting in an unattractive appearance of the cockpit steering wheel. Additionally, after entering the autonomous driving phase, the steering wheel occupies space, preventing the installation of a large screen in the cockpit and hindering comfortable entertainment and office use. Furthermore, merely folding the steering wheel would render the airbags on the steering wheel unusable, posing a threat to the driver.

SUMMARY

The disclosure provides a steering wheel hiding system, method, and vehicle that can hide the steering wheel when the vehicle enters an autonomous driving state.

In a first aspect, a steering wheel hiding system applied to a vehicle is provided. A steering wheel hiding system for a vehicle, the vehicle includes a center console having a steering wheel, and a display; the steering wheel comprising a steering wheel assembly, and a steering column connected to the steering wheel assembly; the steering column being configured to telescopically drive the steering wheel assembly to embed into or extend out of the center console, wherein the steering wheel hiding system includes a steering wheel movement device, comprising a steering column return unit, a column tilting unit, a steering wheel assembly folding unit, and a column telescoping unit; the steering column return unit being configured to control rotation of the column to drive the steering wheel to rotate to a predetermined alignment position; the column tilting unit being configured to control tilting of the steering column to enable the steering wheel assembly to be embedded into the center console; the steering wheel assembly folding unit being configured to control the folding of the steering wheel assembly to be embeddable into the center console; the column telescoping unit being configured to control the retraction of the steering column towards the center console to drive the steering wheel assembly to embed into the center console; a display movement device, configured to control the movement of the display to a position that obscures the steering wheel assembly and, away from a side of the center console; a driving state acquisition device, configured to acquire the driving state of the vehicle; and a controller, comprising a judging unit, a decoupling unit, and a control unit; the judging unit being configured to determine whether the driving state is an autonomous driving state; when the driving state is an autonomous driving state, the decoupling unit being configured to control the decoupling of the vehicle from the steering wheel; when the vehicle is decoupled from the steering wheel, the control unit being configured to control the steering wheel movement device to drive the steering wheel to embed into the center console and to control the display movement device to drive the display to obscure the steering wheel.

In a second aspect, the vehicle comprising a center console equipped with a steering wheel and a display, the steering wheel comprising a steering wheel assembly, and a steering column connected to the steering wheel assembly; the steering column being configured to telescopically drive the steering wheel assembly to embed into or extend out of the center console; the steering wheel hiding system includes a steering wheel movement device, a display movement device, a driving state acquisition device, and a controller; wherein the steering wheel hiding method includes: acquiring driving states of the vehicle using the driving state acquisition device; determining whether the driving state is an autonomous driving state; when the driving state is an autonomous driving state, controlling the decoupling of the vehicle from the steering wheel; when the vehicle is decoupled from the steering wheel, using the steering wheel movement device to drive the steering wheel to embed into the center console, specifically includes: controlling the rotation of the steering column to drive the steering wheel to rotate to a predetermined alignment position; controlling the tilting of the steering column to enable the steering wheel assembly to be embedded into the center console; controlling the folding of the steering wheel assembly to be embeddable into the center console; and controlling the retraction of the steering column towards the center console to drive the steering wheel assembly to embed into the center console; and when the vehicle is decoupled from the steering wheel, using the display movement device to drive the display to obscure the steering wheel, specifically includes: when the steering wheel assembly is embedded into the center console, controlling the display to move to a position that obscures the steering wheel assembly and is away from the side of the center console.

In a third aspect, a vehicle is provided. The vehicle includes a vehicle body, and the steering wheel hiding system according to the above, disposed on the vehicle body. The vehicle body is provided with a center console equipped with a steering wheel and a display. The steering wheel includes a steering wheel assembly and a column connected to the steering wheel assembly. The column can telescopically drive the steering wheel assembly to embed into or extend out of the center console.

The aforementioned steering wheel hiding system, method, and vehicle, by acquiring the driving state of the vehicle, determine whether the vehicle is in an autonomous driving state. After determining that the driving state is an autonomous driving state, they control the folding of the steering wheel assembly and the movement of the column, and control the movement of the vehicle's display to obscure the steering wheel assembly. This ensures that the steering wheel does not occupy driving and passenger space while obscuring the steering wheel to enhance the aesthetics of the cockpit. Additionally, by using the display to obscure the steering wheel, a large screen can be installed in the cockpit, improving office comfort.

BRIEF DESCRIPTION OF THE DRAWINGS

To more clearly illustrate the technical solutions in the embodiments of the disclosure or in the prior art, the drawings required for the description of the embodiments or the prior art will be briefly introduced below. It is obvious that the drawings in the following description are only some embodiments of the disclosure. For those of ordinary skill in the art, other drawings can be obtained based on these drawings without creative efforts.

The objectives, functional characteristics, and advantages of the disclosure will be further explained in conjunction with the embodiments and with reference to the accompanying drawings.

DETAILED DESCRIPTION OF THE EMBODIMENTS

In order to make the purpose, technical solution, and advantages of disclosure clearer and clearer, the following will provide further detailed explanations of disclosure in conjunction with the accompanying drawings and embodiments. It should be understood that the specific embodiments described here are only intended to explain the present application and are not intended to limit the present application. Based on the embodiments in disclosure, all other embodiments obtained by ordinary technical personnel in this field without creative labor fall within the scope of protection of disclosure.

The terms “first,” “second,” “third,” “fourth,” etc. (if present) in the specification, claims, and accompanying drawings of the present application are used to distinguish similar planning objects and are not necessarily used to describe a specific sequence or order. It should be understood that such terms, when used, may be interchangeable under appropriate circumstances. In other words, the described embodiments may be implemented in an order other than that illustrated or described herein. Furthermore, the terms “include” and “have” and any variations thereof may also encompass additional content. For example, a process, method, system, product, or device comprising a series of steps or units is not limited to only those steps or units clearly listed but may include other steps or units not clearly listed or inherent to those processes, methods, products, or device.

It is understood that the descriptions involving “first,” “second,” etc., in the present application are solely for descriptive purpos and should not be understood as indicating or implying their relative importance or implicitly specifying the number of indicated technical features. Therefore, features qualified by “first,” “second,” etc., may explicitly or implicitly include one or more of such features. In addition, the technical solutions among the various embodiments may be combined with each other, but this must be based on the ability of ordinary skilled artisans in the field to achieve such combinations. When the combination of technical solutions contradicts each other or cannot be implemented, such combinations should be deemed non-existent and not within the scope of protection claimed in the present application.

Figure 1:
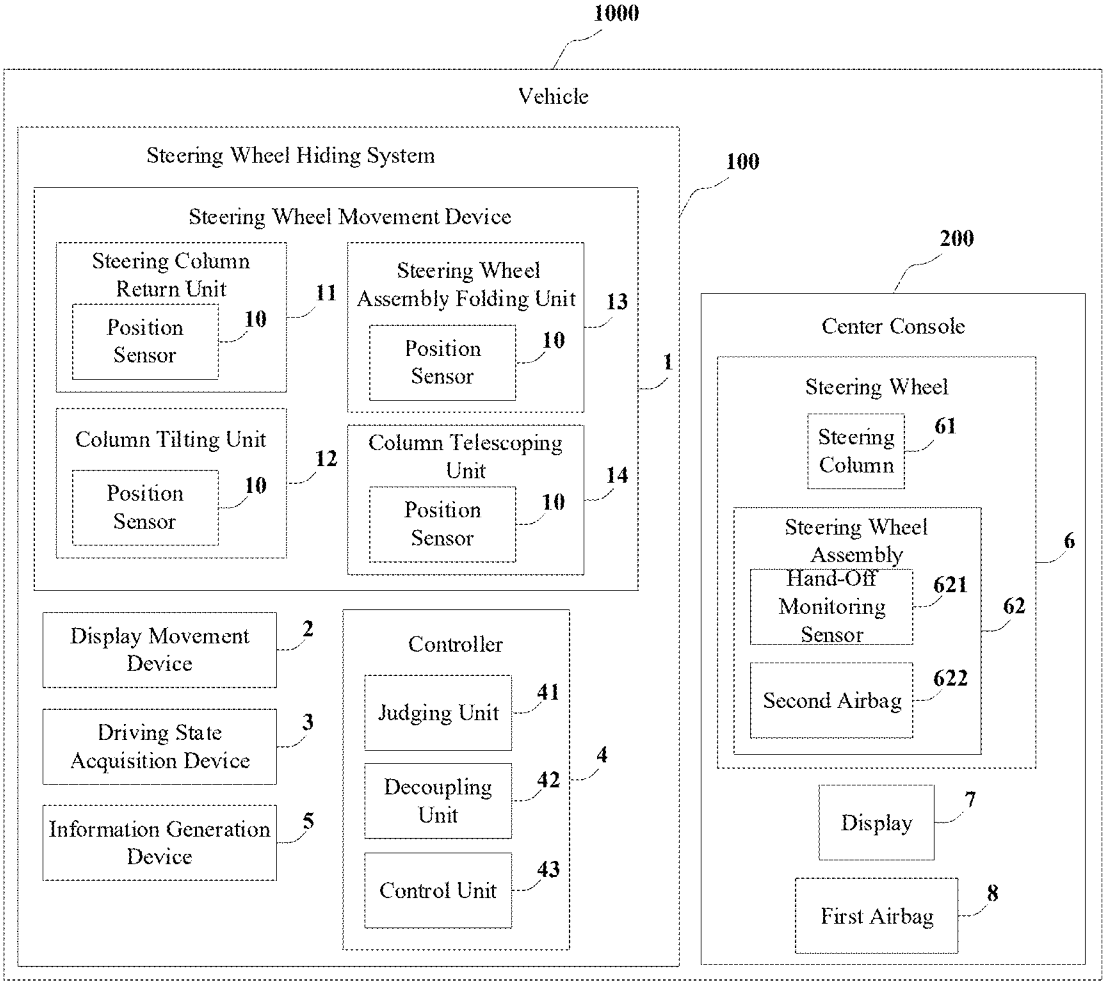
FIG. 1 is a schematic structural diagram of a steering wheel hiding system in accordance with an embodiment.

Referring to FIG. 1, which is a schematic structural diagram of a steering wheel hiding system in accordance with an embodiment, the disclosure provides a steering wheel hiding system 100. The steering wheel hiding system 100 is applied to a vehicle 1000. The vehicle 1000 includes a center console 200 equipped with a steering wheel 6 and a display 7. In the disclosure, the steering wheel 6 includes a steering wheel assembly 62 and a column 61 connected to the steering wheel assembly 62. The column 61 can telescopically drive the steering wheel assembly 62 to embed into or extend out of the center console 200, thereby enabling the steering wheel 6 to be accommodated by or exposed from the center console 200. The disclosure achieves the accommodation and obscuration of the steering wheel 6 by keeping it invisible when the vehicle 1000 enters an autonomous driving state through the steering wheel hiding system 100. The specific features of the steering wheel hiding system 100 will be elaborated below.

As shown in FIG. 1, the steering wheel hiding system 100 includes a steering wheel movement device 1, a display movement device 2, a driving state acquisition device 3, and a controller 4. The specific features of each component in the steering wheel hiding system 100 will be elaborated below.

In this embodiment, the driving state acquisition device 3 is configured to acquire the driving state of the vehicle 1000, such as manual driving state, autonomous driving state, non-driving state, etc. The controller 4 includes a judging unit 41, a decoupling unit 42, and a control unit 43. The judging unit 41 is configured to determine whether the driving state is an autonomous driving state. When the driving state is an autonomous driving state, the operational frequency of the steering wheel 6 is significantly reduced. At this time, the steering wheel hiding system 100 can accommodate the steering wheel 6 in the center console 200 to improve cabin space. Specifically, when the driving state is an autonomous driving state, the decoupling unit 42 is configured to control the decoupling of the vehicle 1000 from the steering wheel 6 to release the control of the vehicle 1000 by the steering wheel 6. That is, operations such as rotation, tilting, and telescoping of the steering wheel 6 will not affect the autonomous driving state of the vehicle 1000. When the vehicle 1000 is decoupled from the steering wheel 6, the control unit 43 is configured to control the steering wheel movement device 1 to drive the steering wheel 6 to embed into the center console 200 and to control the display movement device 2 to drive the display 7 to obscure the steering wheel 6.

In some embodiments, when the driving state is a non-driving state, the steering wheel 6 can also be independently accommodated in the center console 200 according to user needs. For example, to increase the temporary storage space in the driver’s seat, the steering wheel hiding system 100 can independently control the accommodation of the steering wheel 6 in the center console 200 by adding a control component independent of the controller 4 to the vehicle 1000, thereby flexibly adjusting the cabin space. The specific features of the steering wheel movement device 1 and the display movement device 2 will be elaborated below to explain how the display 7 obscures the steering wheel 6.

In this embodiment, the steering wheel movement device 1 includes a steering column return unit 11, a column tilting unit 12, a steering wheel assembly folding unit 13, and a column telescoping unit 14. The steering column return unit 11, column tilting unit 12, the steering wheel assembly folding unit 13, and the column telescoping unit 14 all drive the column 61 and/or the steering wheel assembly 62 to perform corresponding operations through corresponding driving devices (not shown). The specific features of each component in the steering wheel movement device 1 will be elaborated below.

In this embodiment, the steering column return unit 11 is configured to control the rotation of the column 61 to drive the steering wheel 6 to rotate to a predetermined alignment position. The steering wheel 6 in the disclosure also includes a rotation angle sensor (not shown). The rotation angle sensor can be used to sense the rotation angle of the column 61 to determine whether the steering wheel 6 has deviated from the predetermined alignment position and to complete the alignment of the steering wheel 6 through this rotation angle. To ensure that the steering wheel 6 accommodated in the center console 200 can still correspond to the current driving direction of the vehicle 1000 after being deployed, it is necessary to complete the alignment of the steering wheel 6 before controlling the folding of the steering wheel assembly 62. Specifically, the current rotation angle of the column 61 is sensed using the rotation angle sensor. Based on the current rotation angle and a predetermined rotation angle, the column 61 is controlled to rotate to drive the steering wheel assembly 62 to rotate to a position corresponding to the current driving direction of the vehicle 1000. The predetermined rotation angle can be the position where the emblem on the steering wheel 6 is aligned with the cabin user (driver).

In some embodiments, it is also possible to judge whether the steering wheel 6 is aligned by observing the external features of the vehicle 1000. Specifically, check whether the emblem on the steering wheel 6 is consistent with the forward direction of the vehicle 1000, that is, whether the steering wheel 6 points straight ahead. If the steering wheel 6 is deviated, for example, the emblem is no longer facing straight ahead, it indicates that the steering wheel 6 is not aligned. At this time, the number of rotations of the steering wheel 6 can be obtained, and after fully turning the steering wheel 6 (e.g., fully turning to the right), the total number of rotations of the steering wheel 6 is remembered. Then, during the alignment process, the steering wheel 6 is rotated in the opposite direction by the same number of rotations until it returns to the initial position.

In this embodiment, the column tilting unit 12 is configured to control the tilting of the column 61 to enable the steering wheel assembly 62 to be embedded into the center console 200. After controlling the column 61 to rotate to drive the steering wheel assembly 62 to the predetermined alignment position, to ensure that the steering wheel 6 does not collide with the center console 200 when being accommodated in the center console 200, it is necessary to control the steering wheel 6 to tilt to at least a position where it can be accommodated in the storage space of the center console 200.

In this embodiment, the steering wheel assembly folding unit 13 is configured to control the folding of the steering wheel assembly 62 to be embeddable into the center console 200. To enable the steering wheel assembly 62 to be accommodated in the center console 200, it is necessary to reduce the cross-sectional area of the steering wheel assembly 62 relative to the center console 200. The steering wheel assembly 62 in the disclosure can be folded towards the direction of the column 61 located in the center console 200. Preferably, the steering wheel assembly 62 is symmetrically folded towards the direction of the column 61 located in the center console 200 with respect to the column 61.

In this embodiment, the column telescoping unit 14 is configured to control the retraction of the column 61 towards the center console 200 to drive the steering wheel assembly 62 to embed into the center console 200. After the steering wheel assembly 62 is folded to be embeddable into the center console 200, the cross-sectional area of the steering wheel assembly 62 is already smaller than that of the storage space. At this time, the driving device provided on the column 61 can be further used to drive the steering wheel assembly 62 to be accommodated in the center console 200.

It can be understood that to ensure that the steering wheel 6 is not damaged due to collisions when being accommodated in the center console 200, the steering wheel assembly 62 should at least complete folding before the column 61 retracts into the center console 200. In the disclosure, the control of folding the steering wheel assembly 62 can be performed first, followed by the control of retracting the column 61 towards the center console 200. Alternatively, under the premise of ensuring that the steering wheel assembly 62 at least completes folding before the column 61 retracts into the center console 200, the folding of the steering wheel assembly 62 and the retraction of the column 61 towards the center console 200 can be controlled simultaneously.

In this embodiment, the display movement device 2 is configured to control the movement of the display 7 to a position that obscures the steering wheel assembly 62 and is away from the side of the center console 200. To further enhance the aesthetics of the cabin in the autonomous driving state, the disclosure achieves the obscuration of the steering wheel 6, which has been accommodated in the center console 200, through the display 7. The display 7 is provided with a corresponding driving device to drive the movement of the display 7. The driving device of the display 7 is arranged corresponding to the layout direction of the center console 200 and can at least drive the display 7 to a position that obscures the steering wheel 6 and is away from the side of the center console 200.

In this embodiment, the display 7 includes a display screen for displaying images. The display 7 enters a working state when obscuring the steering wheel 6. The display 7 can be some entertainment display device to enhance the user's driving experience. The display 7 can also be used to display the current state of the vehicle 1000, such as the current speed, remaining fuel/electricity quantity, remaining sustainable driving time, and cumulative driving time of the vehicle 1000 in the driving state, or to add control components on the basis of displaying images, such as components for switching the driving state of the vehicle 1000 or components for switching the control state of the steering wheel 6. When the vehicle 1000 needs to switch states, the user can directly perform corresponding operations on the control components on the display 7 to further control the driving state of the vehicle 1000. When the display 7 obscures the steering wheel 6, to enable the user to use the display 7 for entertainment and other operations, the display screen of the display 7 faces away from the steering wheel 6. It can be understood that to enable the display 7 to fully obscure the steering wheel 6, the coverage area of the display 7 should be large enough to obscure the steering wheel 6. To minimize the coverage area of the display 7 while meeting the above condition, the angle formed between the display 7 and the steering wheel 6 should also be as small as possible. For example, the display 7 can be set parallel to the steering wheel 6 to minimize the coverage area of the display 7 required for obscuring the steering wheel 6, thereby reducing the cost of the display 7.

In the aforementioned embodiments, the specific features of each component in the steering wheel hiding system 100 have been elaborated. In the disclosure, the column tilting unit 12, the steering wheel assembly folding unit 13, the column telescoping unit 14, and the display movement device 2 are respectively provided with corresponding position sensors 10. The corresponding position sensors 10 are respectively used to detect whether the column 61 is tilted to a first predetermined position, whether the steering wheel assembly 62 is folded to a second predetermined position, whether the column 61 is retracted to a third predetermined position, and whether the display 7 is moved to a fourth predetermined position. The first predetermined position, second predetermined position, third predetermined position, and fourth predetermined position in the disclosure can be independently adjusted according to the needs of the steering wheel 6 and the display 7. When one or more of the steering wheel assembly 62, the column 61, and the display 7 are not yet located at their respective predetermined positions, they need to be correspondingly restored to their positions when the vehicle 1000 is not in an autonomous driving state.

Furthermore, when the display 7 is moved to the fourth predetermined position, the display screen faces away from the steering wheel assembly 62. When the column 61 is retracted to the third predetermined position, the steering wheel assembly 62 is located outside the movement path of the display screen to avoid blocking the display 7 and causing damage to the display 7 and/or the steering wheel 6, while also enabling the display screen to obscure the steering wheel assembly 62.

In this embodiment, the steering wheel assembly 62 is also provided with a hand-off monitoring sensor 621. The hand-off monitoring sensor 621 can sense whether a human hand is gripping or in contact with the steering wheel assembly 62 of the steering wheel 6 or whether there is an obstacle in contact with the steering wheel assembly 62 of the steering wheel 6. That is, the hand-off monitoring sensor 621 is used to monitor whether the user is controlling the steering wheel 6 in the autonomous driving state and whether there is an obstacle on the steering wheel 6. Specifically, the hand-off monitoring sensor 621 is used to monitor the contact information of the steering wheel 6. The contact information includes the grip information of the steering wheel 6 and/or obstacle information. The grip information is the operational information of the steering wheel 6 by the user, and the obstacle information is the obstacle information on the steering wheel assembly 62. When contact information is monitored and the contact information is only grip information, it indicates that the user is controlling the steering wheel 6. At this time, it is necessary to control the steering wheel 6 not to be hidden in the autonomous driving state. Therefore, the control unit 43 is also configured to respectively control the steering wheel assembly 62 and the column 61 to restore to a first initial position and a second initial position. The first initial position and the second initial position are the positions of the steering wheel assembly 62 and the column 61, respectively, when the vehicle 1000 is not in an autonomous driving state.

Furthermore, the steering wheel hiding system 100 also includes an information generation device 5. When contact information is monitored and obstacle information exists in the contact information, the information generation device 5 is configured to generate a prompt message to indicate to the user that there is an obstacle on the steering wheel assembly 62, thereby prompting the user to stop driving and handle the corresponding obstacle to ensure the user's driving safety.

In the aforementioned embodiments, the corresponding processing of the contact information on the steering wheel 6 when the vehicle 1000 enters an autonomous driving state has been elaborated. To avoid the problem that only folding the steering wheel 6 will render the airbags provided on the steering wheel 6 unusable, posing a threat to the user, improvements need to be made to the layout positions of the airbags in the vehicle 1000. The specific improvements to the layout of the airbags in the vehicle 1000 will be elaborated below.

Figure 2:
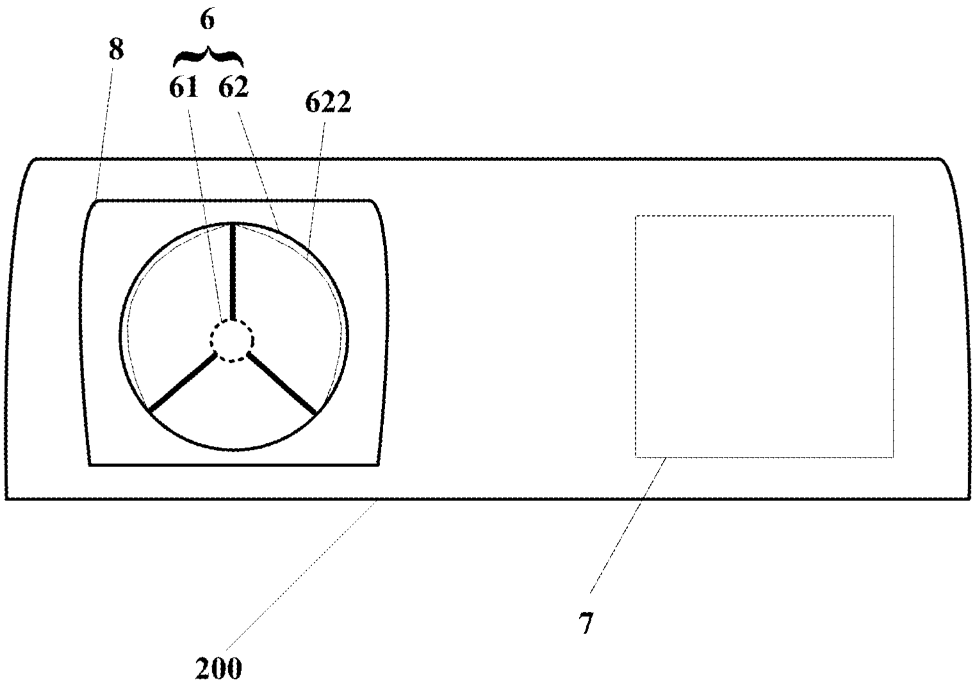
FIG. 2 is a schematic diagram of a center console in accordance with an embodiment.

Referring to FIG. 2, which is a schematic diagram of the center console in accordance with an embodiment.

As shown in FIG. 2, a first airbag 8 is provided on a side of the center console 200 close to the steering wheel 6. The steering wheel assembly 62 is provided with a second airbag 622 (an airbag provided on the steering wheel 6). When the column 61 is retracted to the third predetermined position, the second airbag 622 is obscured by the display 7. The disclosure can also achieve the activation of different airbags in different driving states to further ensure the user's driving safety. Specifically, when the driving state is an autonomous driving state, since the column 61 is retracted to the third predetermined position, the second airbag 622 is obscured by the display 7. The second airbag 622 in the autonomous driving state cannot protect the user when detonated. Therefore, the control unit 43 is also configured to control the second airbag 622 to be non-detonatable and to control the first airbag 8 to be detonatable. When the driving state is a non-autonomous driving state, the control unit 43 is also configured to control the second airbag 622 to be detonatable and to control the first airbag 8 to be non-detonatable.

Figure 3:
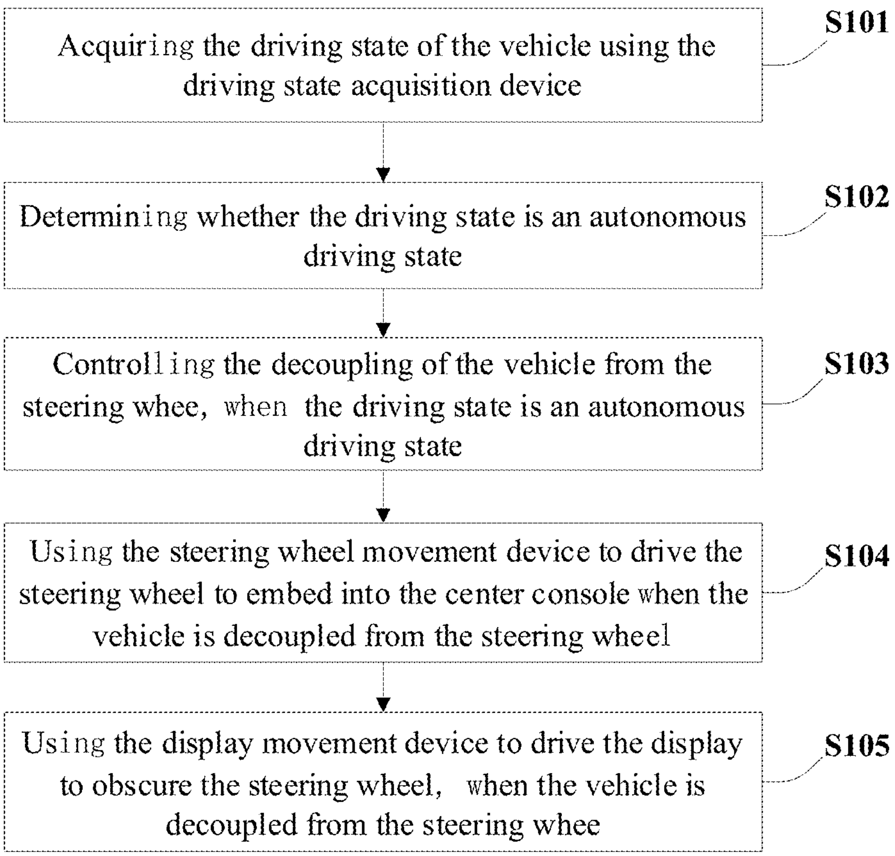
FIG. 3 is a first flowchart of a steering wheel hiding method in accordance with an embodiment.
Figure 4:
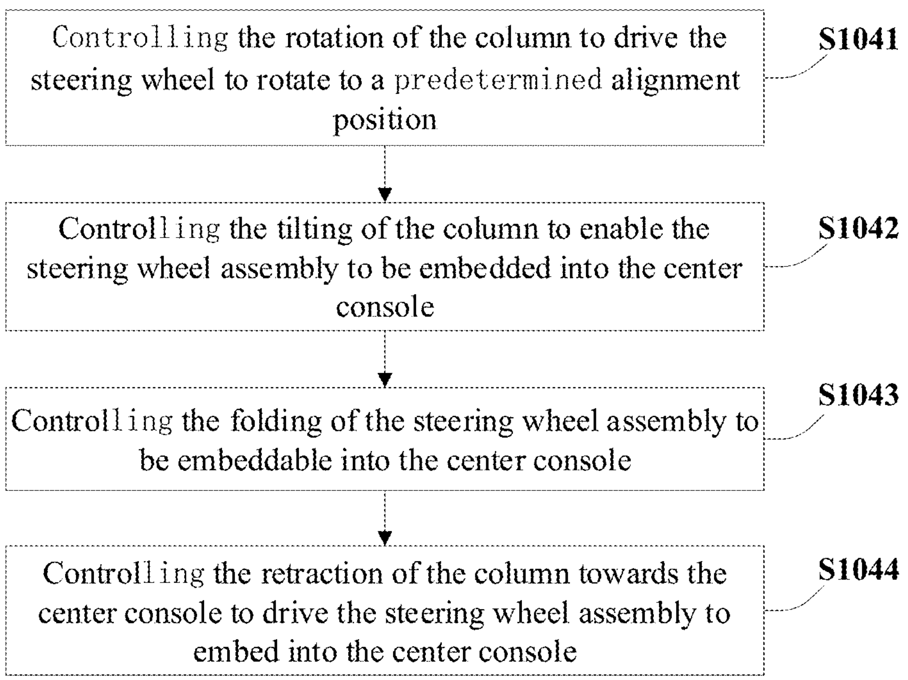
FIG. 4 is a flowchart of sub-steps of step S104 in accordance with an embodiment.
Figure 5:
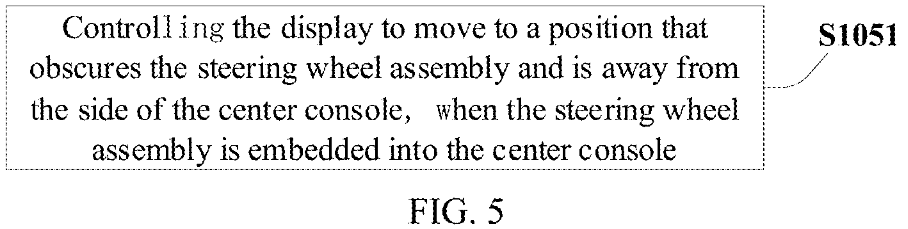
FIG. 5 is a flowchart of sub-steps of step S105 in accordance with an embodiment.

Referring to FIGS. 3-5, FIG. 3 is a first flowchart of a steering wheel hiding method in accordance with an embodiment, FIG. 4 is a flowchart of sub-steps of step S104 in accordance with an embodiment, and FIG. 5 is a flowchart of sub-steps of step S105 in accordance with an embodiment. The disclosure also provides a steering wheel hiding method. The steering wheel hiding method is applied to the steering wheel hiding system 100. The steering wheel hiding system 100 is applied to the vehicle 1000. The vehicle 1000 includes a center console 200 equipped with a steering wheel 6 and a display 7. The steering wheel 6 includes a steering wheel assembly 62 and a column 61 connected to the steering wheel assembly 62. The column 61 can telescopically drive the steering wheel assembly 62 to embed into or extend out of the center console 200. The steering wheel hiding system 100 includes a steering wheel movement device 1, a display movement device 2, a driving state acquisition device 3, and a controller 4. The specific features of the steering wheel hiding system 100 have been elaborated in detail in the aforementioned embodiments and will not be elaborated on further here. The steering wheel hiding method includes steps S101-S105.

In the step S101: acquiring the driving state of the vehicle using the driving state acquisition device.

In the step S101, the driving state of the vehicle 1000 includes but is not limited to manual driving state, autonomous driving state, non-driving state, etc.

In the step S102: determining whether the driving state is an autonomous driving state.

In the step S102, when the driving state is an autonomous driving state, the operational frequency of the steering wheel 6 is significantly reduced. At this time, the steering wheel hiding system 100 can accommodate the steering wheel 6 in the center console 200 to improve cabin space.

In the step S103: controlling the decoupling of the vehicle from the steering whee, when the driving state is an autonomous driving state.

In the step S103, the decoupling unit 42 can be used to control the decoupling of the vehicle 1000 from the steering wheel 6 to release the control of the vehicle 1000 by the steering wheel 6. That is, operations such as rotation, tilting, and telescoping of the steering wheel 6 will not affect the autonomous driving state of the vehicle 1000.

In the step S104: using the steering wheel movement device to drive the steering wheel to embed into the center console when the vehicle is decoupled from the steering wheel.

In the step S104, when the vehicle 1000 is decoupled from the steering wheel 6, the steering wheel 6 can be driven to perform corresponding operations to embed into the center console 200 by controlling the steering wheel movement device 1. How to drive the steering wheel 6 to perform corresponding operations will be elaborated below.

Referring to FIG. 4, using the steering wheel movement device to drive the steering wheel to embed into the center console includes steps S1041-S1044.

In the step S1041: controlling the rotation of the column to drive the steering wheel to rotate to a predetermined alignment position.

In the step S1041, the steering wheel 6 also includes a rotation angle sensor. The rotation angle sensor can be used to sense the rotation angle of the column 61 to determine whether the steering wheel 6 has deviated from the predetermined alignment position and to complete the alignment of the steering wheel 6 through this rotation angle. To ensure that the steering wheel 6 accommodated in the center console 200 can still correspond to the current driving direction of the vehicle 1000 after being deployed, it is necessary to complete the alignment of the steering wheel 6 before controlling the folding of the steering wheel assembly 62. Specifically, the current rotation angle of the column 61 is sensed using the rotation angle sensor. Based on the current rotation angle and a predetermined rotation angle, the column 61 is controlled to rotate to drive the steering wheel assembly 62 to rotate to a position corresponding to the current driving direction of the vehicle 1000. The predetermined rotation angle can be the position where the emblem on the steering wheel 6 is aligned with the cabin user (driver).

In some embodiments, it is also possible to judge whether the steering wheel 6 is aligned by observing the external features of the vehicle 1000. Specifically, check whether the emblem on the steering wheel 6 is consistent with the forward direction of the vehicle 1000, that is, whether the steering wheel 6 points straight ahead. If the steering wheel 6 is deviated, for example, the emblem is no longer facing straight ahead, it indicates that the steering wheel 6 is not aligned. At this time, the number of rotations of the steering wheel 6 can be obtained, and after fully turning the steering wheel 6 (e.g., fully turning to the right), the total number of rotations of the steering wheel 6 is remembered. Then, during the alignment process, the steering wheel 6 is rotated in the opposite direction by the same number of rotations until it returns to the initial position.

In the step S1042: controlling the tilting of the column to enable the steering wheel assembly to be embedded into the center console.

In the step S1042, after controlling the column 61 to rotate to drive the steering wheel assembly 62 to the predetermined alignment position, to ensure that the steering wheel 6 does not collide with the center console 200 when being accommodated in the center console 200, it is necessary to control the steering wheel 6 to tilt to at least a position where it can be accommodated in the storage space of the center console 200.

In the step S1043: controlling the folding of the steering wheel assembly to be embeddable into the center console.

In the step S1043, to enable the steering wheel assembly 62 to be accommodated in the center console 200, it is necessary to reduce the cross-sectional area of the steering wheel assembly 62 relative to the center console 200. The steering wheel assembly 62 in the disclosure can be folded towards the direction of the column 61 located in the center console 200. Preferably, the steering wheel assembly 62 is symmetrically folded towards the direction of the column 61 located in the center console 200 with respect to the column 61.

In the step S1044: controlling the retraction of the column towards the center console to drive the steering wheel assembly to embed into the center console.

In step S1044, after the steering wheel assembly 62 is folded to be embeddable into the center console 200, the cross-sectional area of the steering wheel assembly 62 is already smaller than that of the storage space. At this time, the driving device provided on the column 61 can be further used to drive the steering wheel assembly 62 to be accommodated in the center console 200.

It can be understood that to ensure that the steering wheel 6 is not damaged due to collisions when being accommodated in the center console 200, the steering wheel assembly 62 should at least complete folding before the column 61 retracts into the center console 200. In the disclosure, the control of folding the steering wheel assembly 62 can be performed first, followed by the control of retracting the column 61 towards the center console 200. Alternatively, under the premise of ensuring that the steering wheel assembly 62 at least completes folding before the column 61 retracts into the center console 200, the folding of the steering wheel assembly 62 and the retraction of the column 61 towards the center console 200 can be controlled simultaneously.

In the step S105: using the display movement device to drive the display to obscure the steering wheel, when the vehicle is decoupled from the steering wheel.

In the step S105, when the vehicle 1000 is decoupled from the steering wheel 6, the display 7 can be driven to perform corresponding operations to obscure the steering wheel 6 by controlling the display movement device 2. How to drive the display 7 to perform corresponding operations will be elaborated below.

Referring to FIG. 5, using the display movement device to drive the display to obscure the steering wheel specifically includes step S1051.

In the step S1051: controlling the display to move to a position that obscures the steering wheel assembly and is away from the side of the center console, when the steering wheel assembly is embedded into the center console.

In the step S1051, to further enhance the aesthetics of the cabin in the autonomous driving state, the disclosure achieves the obscuration of the steering wheel 6, which has been accommodated in the center console 200, through the display 7. The display 7 is provided with a corresponding driving device to drive the movement of the display 7. The driving device of the display 7 is arranged corresponding to the layout direction of the center console 200 and can at least drive the display 7 to a position that obscures the steering wheel 6 and is away from the side of the center console 200. The display 7 includes a display screen for displaying images. The display 7 enters a working state when obscuring the steering wheel 6. The display 7 can be some entertainment display device to enhance the user's driving experience. The display 7 can also be used to display the current state of the vehicle 1000, such as the current speed, remaining fuel/electricity quantity, remaining sustainable driving time, and cumulative driving time of the vehicle 1000 in the driving state, or to add control components on the basis of displaying images, such as components for switching the driving state of the vehicle 1000 or components for switching the control state of the steering wheel 6. When the vehicle 1000 needs to switch states, the user can directly perform corresponding operations on the control components on the display 7 to further control the driving state of the vehicle 1000. When the display 7 obscures the steering wheel 6, to enable the user to use the display 7 for entertainment and other operations, the display screen of the display 7 faces away from the steering wheel 6. It can be understood that to enable the display 7 to fully obscure the steering wheel 6, the coverage area of the display 7 should be large enough to obscure the steering wheel 6. To minimize the coverage area of the display 7 while meeting the above condition, the angle formed between the display 7 and the steering wheel 6 should also be as small as possible. For example, the display 7 can be set parallel to the steering wheel 6 to minimize the coverage area of the display 7 required for obscuring the steering wheel 6, thereby reducing the cost of the display 7.

Figure 6:
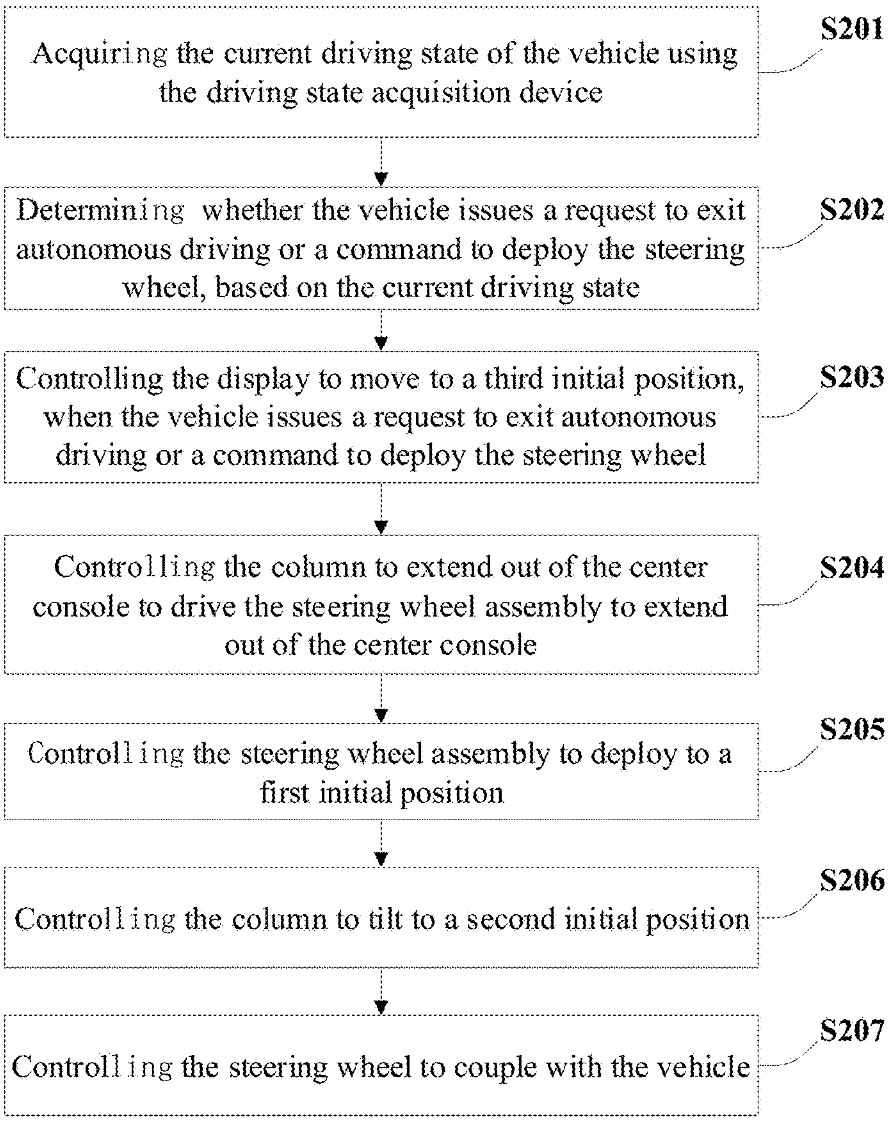
FIG. 6 is a second flowchart of a steering wheel hiding method in accordance with an embodiment.

Referring to FIG. 6, which is a second flowchart of a steering wheel hiding method in accordance with an embodiment. On the basis of the display obscuring the steering wheel in the autonomous driving state, the disclosure can also achieve the restoration of the steering wheel to a controllable state according to the driving state of the vehicle or whether the user needs to control the steering wheel. Specifically, after controlling the display to move to a position that obscures the steering wheel assembly and is away from the side of the center console, the steering wheel hiding method further includes steps S201-S207.

In the step S201: acquiring the current driving state of the vehicle using the driving state acquisition device.

In the step S202: determining whether the vehicle issues a request to exit autonomous driving or a command to deploy the steering wheel, based on the current driving state.

In the step S203: controlling the display to move to a third initial position, when the vehicle issues a request to exit autonomous driving or a command to deploy the steering wheel.

In step S203, the third initial position is the position of the display 7 when the vehicle is not in an autonomous driving state.

In the step S204: controlling the column to extend out of the center console to drive the steering wheel assembly to extend out of the center console.

In the step S205: controlling the steering wheel assembly to deploy to a first initial position.

In step S205, the first initial position is the position of the steering wheel assembly 62 when the vehicle 1000 is not in an autonomous driving state.

In the step S206: controlling the column to tilt to a second initial position.

In step S206, the second initial position is the position of the column 61 when the vehicle 1000 is not in an autonomous driving state.

In the step S207: controlling the steering wheel to couple with the vehicle.

In step S207, when the steering wheel 6 is coupled with the vehicle 1000, the steering wheel 6 resumes control of the vehicle 1000. That is, operations such as rotation, tilting, and telescoping of the steering wheel 6 will affect the driving state of the vehicle 1000.

Figure 7:
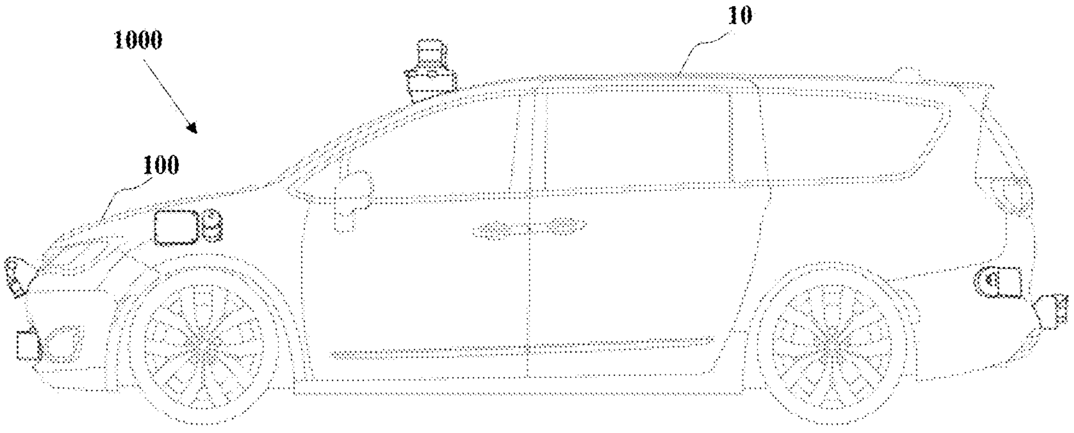
FIG. 7 is a schematic diagram of a vehicle in accordance with an embodiment.

Referring to FIG. 7, which is a schematic diagram of a vehicle in accordance with an embodiment.

As shown in FIG. 7, the disclosure also provides a vehicle 1000. The vehicle 1000 includes a vehicle body 10 and the steering wheel hiding system 100 provided on the vehicle body 10. The vehicle body 10 is provided with a center console 200 equipped with a steering wheel 6 and a display 7. The steering wheel 6 includes a steering wheel assembly 62 and a column 61 connected to the steering wheel assembly 62. The column 61 can telescopically drive the steering wheel assembly 62 to embed into or extend out of the center console 200. The specific features of the steering wheel hiding system 100 have been elaborated in detail in the aforementioned embodiments and will not be elaborated on further here.

In the aforementioned embodiments, by acquiring the driving state of the vehicle, it is determined whether the vehicle is in an autonomous driving state. After determining that the driving state is an autonomous driving state, the folding of the steering wheel assembly and the movement of the column are controlled, and the movement of the vehicle's display to obscure the steering wheel assembly is controlled. This ensures that the steering wheel does not occupy driving and passenger space while obscuring the steering wheel to enhance the aesthetics of the cabin. Additionally, by using the display to obscure the steering wheel, a large screen can be installed in the cabin, improving office comfort.

Obviously, those skilled in the art can make various modifications and variations to the disclosure without departing from the spirit and scope of the disclosure. In this case, if such modifications and variations of the disclosure fall within the scope of the claims and their equivalents, the disclosure is also intended to include these modifications and variations.

It should be understood that although the steps in the flowcharts of the drawings are indicated by arrows, these steps are not necessarily performed in the order indicated by the arrows. Unless explicitly stated in the disclosure, the execution of these steps is not strictly order-limited, and they can be performed in other orders. Moreover, at least a part of the steps in the flowcharts of the drawings may include multiple sub-steps or multiple stages. These sub-steps or stages are not necessarily performed at the same time but may be performed at different times. The execution order of these sub-steps or stages is also not necessarily performed in sequence but may be performed alternately or alternately with other steps or at least a part of the sub-steps or stages of other steps.

The above-listed are merely preferred embodiments of the disclosure and are not intended to limit the protection scope of the disclosure. Therefore, equivalent changes made according to the claims of the disclosure still fall within the scope covered by the disclosure.

The invention claimed is:

1. A steering wheel hiding system for a vehicle, the vehicle comprising a center console having a steering wheel, and a display; the steering wheel comprising a steering wheel assembly, and a steering column connected to the steering wheel assembly; the steering column being configured to telescopically drive the steering wheel assembly to embed into or extend out of the center console, wherein the steering wheel hiding system comprises:

a steering wheel movement device, comprising a steering column return unit, a column tilting unit, a steering wheel assembly folding unit, and a column telescoping unit; the steering column return unit being configured to control rotation of the column to drive the steering wheel to rotate to a predetermined alignment position; the column tilting unit being configured to control tilting of the steering column to enable the steering wheel assembly to be embedded into the center console; the steering wheel assembly folding unit being configured to control the folding of the steering wheel assembly to be embeddable into the center console; the column telescoping unit being configured to control the retraction of the steering column towards the center console to drive the steering wheel assembly to embed into the center console;

a display movement device, configured to control the movement of the display to a position that obscures the steering wheel assembly and, away from a side of the center console;

a driving state acquisition device, configured to acquire the driving state of the vehicle; and a controller, comprising a judging unit, a decoupling unit, and a control unit; the judging unit being configured to determine whether the driving state is an autonomous driving state; when the driving state is an autonomous driving state, the decoupling unit being configured to control the decoupling of the vehicle from the steering wheel; when the vehicle is decoupled from the steering wheel, the control unit being configured to control the steering wheel movement device to drive the steering wheel to embed into the center console and to control the display movement device to drive the display to obscure the steering wheel.

2. The steering wheel hiding system according to claim 1, wherein the column tilting unit, the steering wheel assembly folding unit, the column telescoping unit, and the display movement device are respectively equipped with corresponding position sensors for detecting whether the steering column is tilted to a first predetermined position, whether the steering wheel assembly is folded to a second predetermined position, whether the steering column is retracted to a third predetermined position, and whether the display is moved to a fourth predetermined position.

3. The steering wheel hiding system according to claim 2, wherein the display comprises a display screen for displaying images; when the display is moved to the fourth predetermined position, the display screen faces away from the steering wheel assembly; when the steering column is retracted to the third predetermined position, the steering wheel assembly is located outside the movement path of the display screen.

4. The steering wheel hiding system according to claim 1, wherein the steering wheel assembly is further equipped with a hand-off monitoring sensor for monitoring contact information of the steering wheel, the contact information is grip information of the steering wheel and/or obstacle information, the grip information is operational information of the steering wheel by a user, the obstacle information is obstacle information on the steering wheel assembly.

5. The steering wheel hiding system according to claim 4, wherein when contact information is monitored and the contact information is only grip information, the control unit is further configured to control the steering wheel assembly and the steering column to resume to a first initial position and a second initial position, respectively, the first initial position and the second initial position are the positions of the steering wheel assembly and the steering column, respectively, when the vehicle is not in an autonomous driving state.

6. The steering wheel hiding system according to claim 5, wherein the steering wheel hiding system further comprises an information generation device; when the contact information is monitored and obstacle information exists in the contact information, the information generation device is configured to generate a prompt message to indicate to the user that there is an obstacle on the steering wheel assembly through the prompt message.

7. The steering wheel hiding system according to claim 1, wherein a first airbag is disposed on a side of the center console close to the steering wheel assembly, and the steering wheel assembly is equipped with a second airbag; when the steering column is retracted to the third predetermined position, the second airbag is obscured by the display; when the driving state is an autonomous driving state, the control unit is further configured to control the second airbag to be non-ignitable and to control the first airbag to be ignitable.

8. A steering wheel hiding method for a vehicle, the vehicle comprising a center console equipped with a steering wheel and a display, the steering wheel comprising a steering wheel assembly, and a steering column connected to the steering wheel assembly; the steering column being configured to telescopically drive the steering wheel assembly to embed into or extend out of the center console; the steering wheel hiding system comprises a steering wheel movement device, a display movement device, a driving state acquisition device, and a controller; wherein the steering wheel hiding method comprises:

acquiring driving states of the vehicle using the driving state acquisition device;

determining whether the driving state is an autonomous driving state;

when the driving state is an autonomous driving state, controlling the decoupling of the vehicle from the steering wheel;

when the vehicle is decoupled from the steering wheel, using the steering wheel movement device to drive the steering wheel to embed into the center console, specifically comprising:

controlling the rotation of the steering column to drive the steering wheel to rotate to a predetermined alignment position;

controlling the tilting of the steering column to enable the steering wheel assembly to be embedded into the center console;

controlling the folding of the steering wheel assembly to be embeddable into the center console; and controlling the retraction of the steering column towards the center console to drive the steering wheel assembly to embed into the center console; and when the vehicle is decoupled from the steering wheel, using the display movement device to drive the display to obscure the steering wheel, specifically comprising:

when the steering wheel assembly is embedded into the center console, controlling the display to move to a position that obscures the steering wheel assembly and is away from the side of the center console.

9. The steering wheel hiding method according to claim 8, wherein after controlling the display to move to a position that obscures the steering wheel assembly and is away from the side of the center console, the steering wheel hiding method further comprises:

acquiring the current driving state of the vehicle using the driving state acquisition device;

determining, based on the current driving state, whether the vehicle issues a request to exit autonomous driving or a command to deploy the steering wheel;

when the vehicle issues a request to exit autonomous driving or a command to deploy the steering wheel, controlling the display to move to a third initial position, the third initial position being the position of the display when the vehicle is not in an autonomous driving state;

controlling the steering column to extend out of the center console to drive the steering wheel assembly to extend out of the center console;

controlling the steering wheel assembly to deploy to a first initial position, the first initial position being the position of the steering wheel assembly when the vehicle is not in an autonomous driving state;

controlling the steering column to tilt to a second initial position, the second initial position being the position of the steering column when the vehicle is not in an autonomous driving state; and controlling the steering wheel to couple with the vehicle.

10. The steering wheel hiding method according to claim 9, wherein the column tilting unit, the steering wheel assembly folding unit, the column telescoping unit, and the display movement device are respectively equipped with corresponding position sensors for detecting whether the steering column is tilted to a first predetermined position, whether the steering wheel assembly is folded to a second predetermined position, whether the steering column is retracted to a third predetermined position, and whether the display is moved to a fourth predetermined position.

11. The steering wheel hiding method according to claim 1, wherein the display comprises a display screen for displaying images; when the display is moved to the fourth predetermined position, the display screen faces away from the steering wheel assembly; when the steering column is retracted to the third predetermined position, the steering wheel assembly is located outside the movement path of the display screen.

12. The steering wheel hiding method according to claim 11, wherein the steering wheel assembly is further equipped with a hand-off monitoring sensor for monitoring contact information of the steering wheel, the contact information is grip information of the steering wheel and/or obstacle information, the grip information is operational information of the steering wheel by a user, the obstacle information is obstacle information on the steering wheel assembly.

13. The steering wheel hiding method according to claim 12, wherein when contact information is monitored and the contact information is only grip information, the control unit is further configured to control the steering wheel assembly and the steering column to resume to a first initial position and a second initial position, respectively, the first initial position and the second initial position are the positions of the steering wheel assembly and the steering column, respectively, when the vehicle is not in an autonomous driving state.

14. The steering wheel hiding method according to claim 13, wherein the steering wheel hiding system further comprises an information generation device; when the contact information is monitored and obstacle information exists in the contact information, the information generation device is configured to generate a prompt message to indicate to the user that there is an obstacle on the steering wheel assembly through the prompt message.

15. The steering wheel hiding method according to claim 8, wherein a first airbag is disposed on a side of the center console close to the steering wheel assembly, and the steering wheel assembly is equipped with a second airbag; when the steering column is retracted to the third predetermined position, the second airbag is obscured by the display; when the driving state is an autonomous driving state, the control unit is further configured to control the second airbag to be non-ignitable and to control the first airbag to be ignitable.

16. A vehicle, wherein the vehicle comprises:

a vehicle body provided with a center console equipped with a steering wheel and a display, the steering wheel comprising a steering wheel assembly and a steering column connected to the steering wheel assembly, the column being configured to telescopically drive the steering wheel assembly to embed into or extend out of the center console; and a steering wheel hiding system disposed on the vehicle body, and comprising:

a steering wheel movement device, comprising a steering column return unit, a column tilting unit, a steering wheel assembly folding unit, and a column telescoping unit; the steering column return unit being configured to control rotation of the column to drive the steering wheel to rotate to a predetermined alignment position; the column tilting unit being configured to control tilting of the steering column to enable the steering wheel assembly to be embedded into the center console; the steering wheel assembly folding unit being configured to control the folding of the steering wheel assembly to be embeddable into the center console; the column telescoping unit being configured to control the retraction of the steering column towards the center console to drive the steering wheel assembly to embed into the center console;

a display movement device, configured to control the movement of the display to a position that obscures the steering wheel assembly and, away from a side of the center console;

a driving state acquisition device, configured to acquire the driving state of the vehicle; and a controller, comprising a judging unit, a decoupling unit, and a control unit, the judging unit being configured to determine whether the driving state is an autonomous driving state; when the driving state is an autonomous driving state, the decoupling unit being configured to control the decoupling of the vehicle from the steering wheel;

when the vehicle is decoupled from the steering wheel, the control unit being configured to control the steering wheel movement device to drive the steering wheel to embed into the center console and to control the display movement device to drive the display to obscure the steering wheel.

17. The vehicle according to claim 16, wherein the column tilting unit, the steering wheel assembly folding unit, the column telescoping unit, and the display movement device are respectively equipped with corresponding position sensors for detecting whether the steering column is tilted to a first predetermined position, whether the steering wheel assembly is folded to a second predetermined position, whether the steering column is retracted to a third predetermined position, and whether the display is moved to a fourth predetermined position.

18. The vehicle according to claim 16, wherein the display comprises a display screen for displaying images; when the display is moved to the fourth predetermined position, the display screen faces away from the steering wheel assembly; when the steering column is retracted to the third predetermined position, the steering wheel assembly is located outside the movement path of the display screen.

19. The vehicle according to claim 16, wherein the steering wheel assembly is further equipped with a hand-off monitoring sensor for monitoring contact information of the steering wheel, the contact information is grip information of the steering wheel and/or obstacle information, the grip information is operational information of the steering wheel by a user, the obstacle information is obstacle information on the steering wheel assembly.

20. The vehicle according to claim 16, wherein when contact information is monitored and the contact information is only grip information, the control unit is further configured to control the steering wheel assembly and the steering column to resume to a first initial position and a second initial position, respectively, the first initial position and the second initial position are the positions of the steering wheel assembly and the steering column, respectively, when the vehicle is not in an autonomous driving state.

* * * * *